J. V. SCAIFE.
GAGE COCK.
APPLICATION FILED MAY 6, 1910.

973,074.

Patented Oct. 18, 1910.

Witnesses
J. S. Freeman.

Inventor
J. V. Scaife.
By C. L. Parker, Attorney

THE NORRIS PETERS CO., WASHINGTON, D. C.

UNITED STATES PATENT OFFICE.

JAMIESON V. SCAIFE, OF McCOMB, MISSISSIPPI.

GAGE-COCK.

973,074.  Specification of Letters Patent.  Patented Oct. 18, 1910.

Application filed May 6, 1910. Serial No. 559,710.

*To all whom it may concern:*

Be it known that I, JAMIESON V. SCAIFE, a citizen of the United States, residing at McComb, in the county of Pike and State of Mississippi, have invented certain new and useful Improvements in Gage - Cocks, of which the following is a specification.

My invention relates to new and useful improvements in gage cocks.

The principal difficulty encountered in using gage cocks upon steam boilers or the like, is the fact that the same often leak. This leakage is caused by sediment or solid particles which is held in suspension in the water, and which is deposited upon the valve seat of the gage cock, and prevents the valve from fitting snugly upon said valve seat.

An important object of this invention is to provide a gage cock embodying a valve which is self-grinding.

A further object of this invention is to provide a gage cock, which is formed of a plurality of parts, which are separable from each other for the purpose of cleansing and repairing the same.

The final object of my invention, is to provide a gage cock, which is simple in construction, efficient in operation, and cheap to manufacture.

Figure 3:
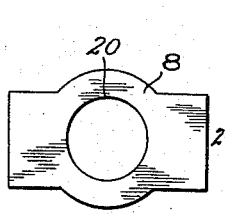
Figure 1:
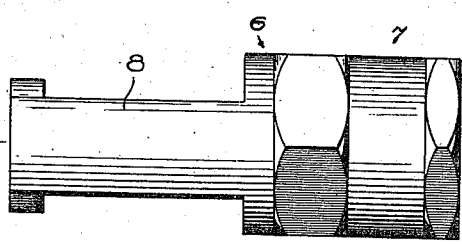
Figure 4:
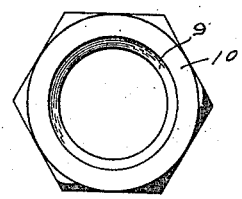
Figure 2:
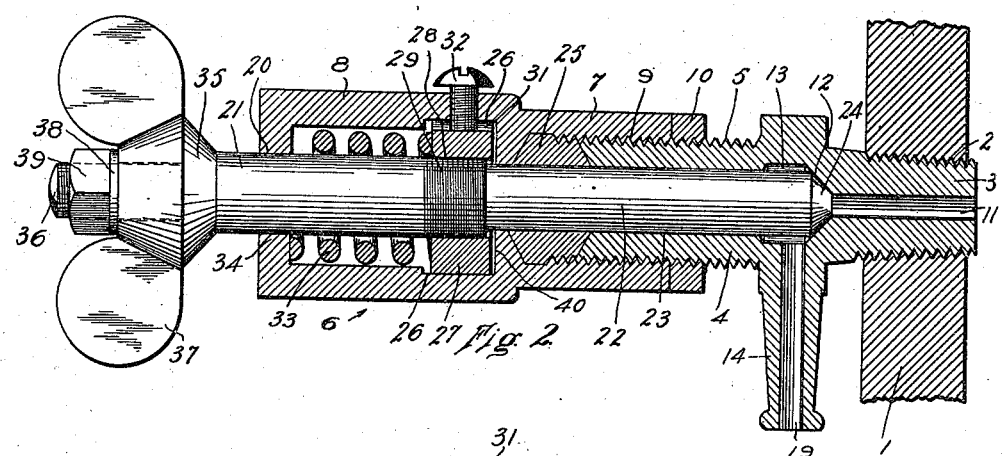
Figure 5:
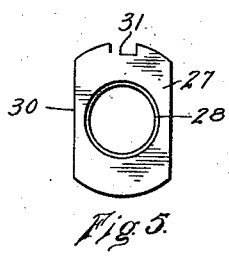

In the accompanying drawings forming a part of this specification, and in which like numerals are used to designate like parts throughout the same, Figure 1 is a side elevation of a portion of the gage cock. Fig. 2 is a longitudinal section through the gage cock. Fig. 3 is a front end view of the member shown in Fig. 1. Fig. 4 is a rear end view of the same. Fig. 5 is an elevation of a nut employed in the gage cock.

As is well known, gage cocks are generally arranged upon a steam boiler, in different horizontal planes to determine the water level in the boiler. These gage cocks are of like construction and therefore a description of one of them will be sufficient.

In the drawings illustrating a preferred embodiment of my invention, the numeral 1 designates a portion of a steam boiler or the like, which is provided as shown with an aperture 2, screw-threaded for the reception of the screw threaded end 3 of the body portion 4 of the gage cock. This body portion is formed cylindrical as shown, and is externally screw-threaded as shown at 5. The body portion 4 is adapted to be arranged within a portion of an outer casing 6, which comprises a cylindrical portion 7 and a skeleton portion 8. The cylindrical portion 7 is internally screw-threaded as shown at 9, for coöperation with the externally screw-threaded body portion 4. A clamping nut 10 is arranged upon the body portion 4 as shown and is adapted to be urged into engagement with the cylindrical portion 7 of the outer casing 6, to prevent the accidental separation of the casing 6 and body portion 4.

The end 3 of the body portion 4 is provided as shown, with an axial opening 11, which extends forwardly to a valve seat 12. The valve seat 12 is frusto-conical and is formed out of the walls of a chamber 13. The body portion 4 has a branch or nipple 14 formed thereon as shown, which extends downwardly at substantially right angles to said body portion. This nipple is provided as shown with an axial opening 19, which communicates with chamber 13. The forward end of the skeleton portion 8 is provided as shown with a circular opening 20, adapted to rotatably receive a valve rod 21, which has a slightly reduced cylindrical portion 22. This slightly reduced portion 22 is rotatably mounted within a cylindrical axial opening 23 formed through the body portion 4 as shown. The free end of the reduced portion 22 of the valve rod is ground to form a frusto-conical portion 24, adapted to be snugly seated upon the valve seat 12. As shown at 25, a suitable form of packing may be arranged within the cylindrical portion 7, which packing will positively prevent the escape of steam between the same and the reduced portion 22 of valve rod.

The skeleton portion 8 is provided internally thereof with segmental grooves 26, which are arranged at diametrically opposite points, and within which is loosely mounted an adjusting nut 27. This adjusting nut 27 is provided with a screw threaded opening 28 extending therethrough, which is adapted to receive a screw threaded portion 29 of the valve rod 21. The adjusting nut 27 is shown as having its opposite sides reduced to form straight walls 30, which are adapted to be flush with the sides of the skeleton portion 8. The nut 27 is provided upon one end with a groove 31, within which is disposed the free end of a screw 32, which is tapped through one side of the skeleton portion 8. By the construction above described it is to be understood that the adjusting nut 27 is normally free to move longitudinally within the grooves 26, while the same is positively prevented from rotating within said grooves. A compressible coil spring 33 surrounds the valve rod 21 as shown, and is arranged within the skeleton portion 8 to engage the end wall 34 and the nut 27. The outer end of the valve rod 21 is provided with a head 35, upon which is formed an externally screw threaded cylindrical extension 36. A thumb nut 37 is arranged upon the extension 36, and a washer 38 arranged in engagement therewith as shown. This washer is held in place by means of a clamping nut 39 as shown.

In the operation of the gage cock, when it is desired to test the water level in the boiler, the operator may unseat the valve rod 21 by rotating the same counter clockwise, whereby the water will be free to pass through the opening 11 into the opening 19. As shown in Fig. 1 when the valve rod is seated upon the valve seat 12, the adjusting nut 27 is out of engagement with the rear wall 40 of the skeleton portion 8, whereby said valve rod is retained in its seated position by the tension of the coil spring 33. Attention is also called to the fact that when the valve rod is being rotated in either direction to seat or unseat the same, that such rotation will cause the automatic grinding of the portion 24 upon the valve seat 12. It is also obvious that all wear between the valve seat and the portion 24 will be automatically taken up by the adjusting nut 27 and spring 33.

I wish it understood that the form of my invention herewith shown and described, is to be taken as a preferred example of the same, and that certain changes in the form and sizes of parts, may be resorted to without departing from the spirit of my invention, as set forth in the annexed claims.

Having fully described my invention, I claim:

1. In a gage cock, a body portion provided with an opening, an outer casing removably mounted upon said body portion, a valve rod extending through said outer casing for closing the opening of said body portion, an adjusting nut arranged within said outer casing in such a manner that the same is capable of moving longitudinally, means for preventing the rotation of said adjusting nut, said valve rod being provided with a screw threaded portion to coöperate with said adjusting nut, and means for urging said adjusting nut in one direction.

2. In a gage cock, a body portion provided with an axial opening, an outer casing having screw threaded engagement upon said body portion, a valve rod extending through said outer casing and said axial opening, said body portion being further provided with a plurality of ports, said valve rod being adapted to control the communication between said ports, an adjusting nut longitudinally movably mounted within said outer casing, and engaging a screw threaded portion of said valve rod, said adjusting nut being provided with a groove, a screw mounted upon said outer casing and having its free end disposed within said groove, a coil spring disposed within said outer casing and surrounding said valve rod to urge said adjusting nut in one direction, and means whereby said valve rod may be rotated.

3. In a gage cock, a body portion provided with an axial opening, an outer casing having screw threaded engagement with said body portion, a valve rod extending through said outer casing and axial opening, said body portion being further provided with a plurality of ports, said valve rod being adapted to control the communication between said ports, an adjusting nut longitudinally movably mounted within said outer casing and having engagement with a screw threaded portion of said valve rod, said adjusting nut being provided with a groove, a screw mounted through said outer casing and having its free end disposed within said groove, a coil spring disposed within said outer casing and surrounding said valve rod to urge said adjusting nut in one direction, packing arranged within said outer casing to surround a portion of said valve rod, and a clamping nut arranged upon said body portion and adapted to engage said outer casing.

In testimony whereof I affix my signature in presence of two witnesses.

JAMIESON V. SCAIFE.

Witnesses:
W. A. BROOKE,
T. W. JAMES.